US008332403B2

(12) United States Patent
Yoshimura et al.

(10) Patent No.: US 8,332,403 B2
(45) Date of Patent: Dec. 11, 2012

(54) INFORMATION PROCESSING APPARATUS, INFORMATION PROCESSING METHOD AND PROGRAM (75) Inventors: Shunji Yoshimura, Tokyo (JP); Tatsuya Narahara, Kanagawa (JP); Hiroshige Okamoto, Kanagawa (JP); Kenichiro Kobayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 653 days.

(21) Appl. No.: 12/047,384

(22) Filed: Mar. 13, 2008

(65) Prior Publication Data
US 2008/0228760 A1 Sep. 18, 2008

(30) Foreign Application Priority Data
Mar. 16, 2007 (JP) ................................ P2007-069295

(51) Int. Cl.
G06F 17/30 (2006.01)
(52) U.S. Cl. ........................... 707/736; 725/44; 725/145
(58) Field of Classification Search .................... 348/553
See application file for complete search history.

(56) References Cited

U.S. PATENT DOCUMENTS

| 6,340,992 B1* | 1/2002 | Markandey | 348/556 |
| 6,711,587 B1* | 3/2004 | Dufaux | 1/1 |
| 6,868,551 B1* | 3/2005 | Lawler et al. | 725/40 |
| 7,058,278 B2* | 6/2006 | Murabayashi | 386/46 |
| 7,181,757 B1* | 2/2007 | Kim et al. | 725/61 |
| 7,209,942 B1* | 4/2007 | Hori et al. | 709/203 |
| 7,398,000 B2* | 7/2008 | Green | 386/46 |
| 7,480,445 B2* | 1/2009 | Yamamoto et al. | 386/249 |
| 7,873,798 B2* | 1/2011 | Miyazaki et al. | 711/154 |
| 7,987,491 B2* | 7/2011 | Reisman | 725/112 |
| 2003/0051252 A1* | 3/2003 | Miyaoku et al. | 725/109 |
| 2003/0212993 A1* | 11/2003 | Obrador | 725/9 |
| 2004/0200337 A1* | 10/2004 | Abe et al. | 84/616 |
| 2005/0262116 A1* | 11/2005 | Yoo et al. | 707/100 |
| 2007/0154163 A1* | 7/2007 | Cordray | 386/52 |

FOREIGN PATENT DOCUMENTS
JP 9 284704 10/1997
* cited by examiner

Primary Examiner — Fred I Ehichioya
Assistant Examiner — Michelle Owyang
(74) Attorney, Agent, or Firm — Frommer Lawrence & Haug LLP; William S. Frommer (57) ABSTRACT An information processing apparatus detecting a characteristic amount of a group of contents of a series configured of contents corresponding to episodes, the information processing apparatus including: a first generating means for detecting a characteristic amount in a time series of the contents corresponding to the episodes and generate a characteristic amount in the episode based on a detected result; a computing means for computing a representative value of the generated characteristic amount in the episode; a second generating means for arranging the computed representative values corresponding to the episodes in a time series and generate a characteristic amount in the series indicating a characteristic amount in a time series of the group of the contents of the series; and a database means for storing the generated characteristic amount in the series in a database in association with the group of the contents of the series.

12 Claims, 6 Drawing Sheets

FIG. 6

INFORMATION PROCESSING APPARATUS, INFORMATION PROCESSING METHOD AND PROGRAM

CROSS REFERENCES TO RELATED APPLICATIONS

The present invention contains subject matter related to Japanese Patent Application JP 2007-069295 filed in the Japanese Patent Office on Mar. 16, 2007, the entire contents of which being incorporated herein by reference.

BACKGROUND OF THE INVENTION

1. Field of the Invention

The present invention relates to an information processing apparatus, an information processing method, and a program. For example, the invention relates to an information processing apparatus, an information processing method, and a program, in which a characteristic amount of contents typified by a television program is detected as a single content is regarded as a unit of processing as well as a plurality of contents broadcast from the first episode to the last episode are regarded as units of processing, and the detected characteristic amounts are stored in a database.

2. Description of the Related Art

With digitized data of contents typified by television programs and a larger capacity of a recording medium, large amounts of contents are increasingly stored. As described above, in the case in which a large amount of contents is stored, as a method of classifying and retrieving the contents, there are methods in which attribute information such as a title, a broadcast date and time, and cast is stored in association with a contents and in which a characteristic amount of a content is detected and stored in association with the content.

As an example of detecting a characteristic amount of a content, there is a method of detecting changes in sounds of the content in a time series (for example, see Patent Reference 1 (JP-A-09-284704)).

For example, the detected characteristic amount of is used for creating a digest version that only the highlight scenes of the contents are extracted.

SUMMARY OF THE INVENTION

The related art methods that detect a characteristic amount of a content are completed as the individual contents are regarded as units of processing, which do not consider a group of contents formed of a plurality of related contents to be a unit of processing to detect the characteristic amount thereof.

More specifically, for example, the broadcasts of individual episodes are regarded as units of processing to detect the characteristic amounts of the episodes of a television program that is broadcast at the same time on the same day every week like a drama series. However, such a scheme is not conducted that the broadcasts from the broadcast of the first episode to the broadcast of the last episode are regarded as units of processing to detect the characteristic amounts of the episodes.

In addition, in the specification, a group of contents formed of a plurality of related contents is referred to as a series, and the individual contents configuring a series are referred to as episodes.

It is desirable to detect a characteristic amount of a series configured of a plurality of episodes and stored in a database, whereby the classification and retrieval of contents in a unit of a series can be facilitated.

An information processing apparatus according to an embodiment of the invention is an information processing apparatus that detects a characteristic amount of a group of contents of a series configured of contents each corresponding to one of a plurality of episodes, the information processing apparatus including: a first generating means for detecting a characteristic amount in a time series of the contents each corresponding to one of the plurality of episodes and generating a characteristic amount in the episode based on a detected result; a computing means for computing a representative value of the generated characteristic amount in the episode; a second generating means for arranging the computed representative values each corresponding to one of the plurality of the episodes in a time series and generating a characteristic amount in the series indicating a characteristic amount in a time series of the group of the contents of the series; and a database means for storing the generated characteristic amount in the series in a database in association with the group of the contents of the series.

The first generating means may detect at least one of changes in a sound level, in a screen, and in an amount of subtitles as a characteristic amount in a time series of the contents each corresponding to one of the plurality of the episodes, and generate a characteristic amount in the episode based on a detected result.

The information processing apparatus according to an embodiment of the invention may further include a classifying means for classifying the group of the contents of the series based on the generated characteristic amount in the series, wherein the database means also stores a classified result by the classifying means in a database in association with the group of the contents of the series.

The information processing apparatus according to an embodiment of the invention may further include a retrieving means for retrieving the group of the contents of the series by referencing to a classified result by the classifying means.

An information processing method according to an embodiment of the invention is an information processing method of an information processing apparatus that detects a characteristic amount of a group of contents of a series configured of contents each corresponding to one of a plurality of episodes, the information processing method including the steps of: detecting a characteristic amount in a time series of the contents each corresponding to one of the plurality of the episodes and generating a characteristic amount in the episode based on a detected result; computing a representative value of the generated characteristic amount in the episode; arranging the computed representative values each corresponding to one of the plurality of the episodes in a time series and generating a characteristic amount in the series indicating a characteristic amount in a time series of a group of contents corresponding to the series; and storing the generated characteristic amount in the series in a database in association with the group of the contents of the series.

A program according to an embodiment of the invention is a program of controlling a computer that detects a characteristic amount of a group of contents of a series configured of contents each corresponding to one of a plurality of episodes, the program allowing the computer to run a process including the steps of: detecting a characteristic amount in a time series of the contents each corresponding to one of the plurality of the episodes and generating a characteristic amount in the episode based on a detected result; computing a representative value of the generated characteristic amount in the episode; arranging the computed representative values each corresponding to one of the plurality of the episodes in a time series and generating a characteristic amount in the series indicating a characteristic amount in a time series of a group of contents corresponding to the series; and storing the generated characteristic amount in the series in a database in association with the group of the contents of the series.

In the embodiment of the invention, a characteristic amount in a time series of the contents each corresponding to one of the plurality of the episodes is detected to generate a characteristic amount in the episode based on a detected result, a representative value of the generated characteristic amount in the episode is computed, and the computed representative values each corresponding to one of the plurality of the episodes are arranged in a time series to generate a characteristic amount in the series indicating a characteristic amount in a time series of a group of contents corresponding to the series.

According to the embodiment of the invention, a characteristic amount of a content can be detected and stored in a database. In addition, according to the embodiment of the invention, a characteristic amount of a content can be detected in a unit of a series and stored in a database. Accordingly, a series configured of a plurality of contents can be easily classified or retrieved in accordance with the characteristic amount thereof.

DETAILED DESCRIPTION OF THE INVENTION

Hereinafter, an embodiment of the invention will be described. The following is examples of the correspondence between configuration requirements for the invention and the embodiments of the specification or the drawings. This is described for confirming that the embodiments supporting the invention are described in the specification or the drawings. Therefore, even though there is an embodiment that is described in the specification or the drawings but is not described herein as an embodiment corresponding to configuration requirements for the invention, it does not mean that the embodiment does not correspond to those configuration requirements. Contrary to this, even though an embodiment is described herein as an embodiment corresponding to configuration requirements, it does not mean that the embodiment does not correspond to configuration requirements other than those configuration requirements.

Figure 1:
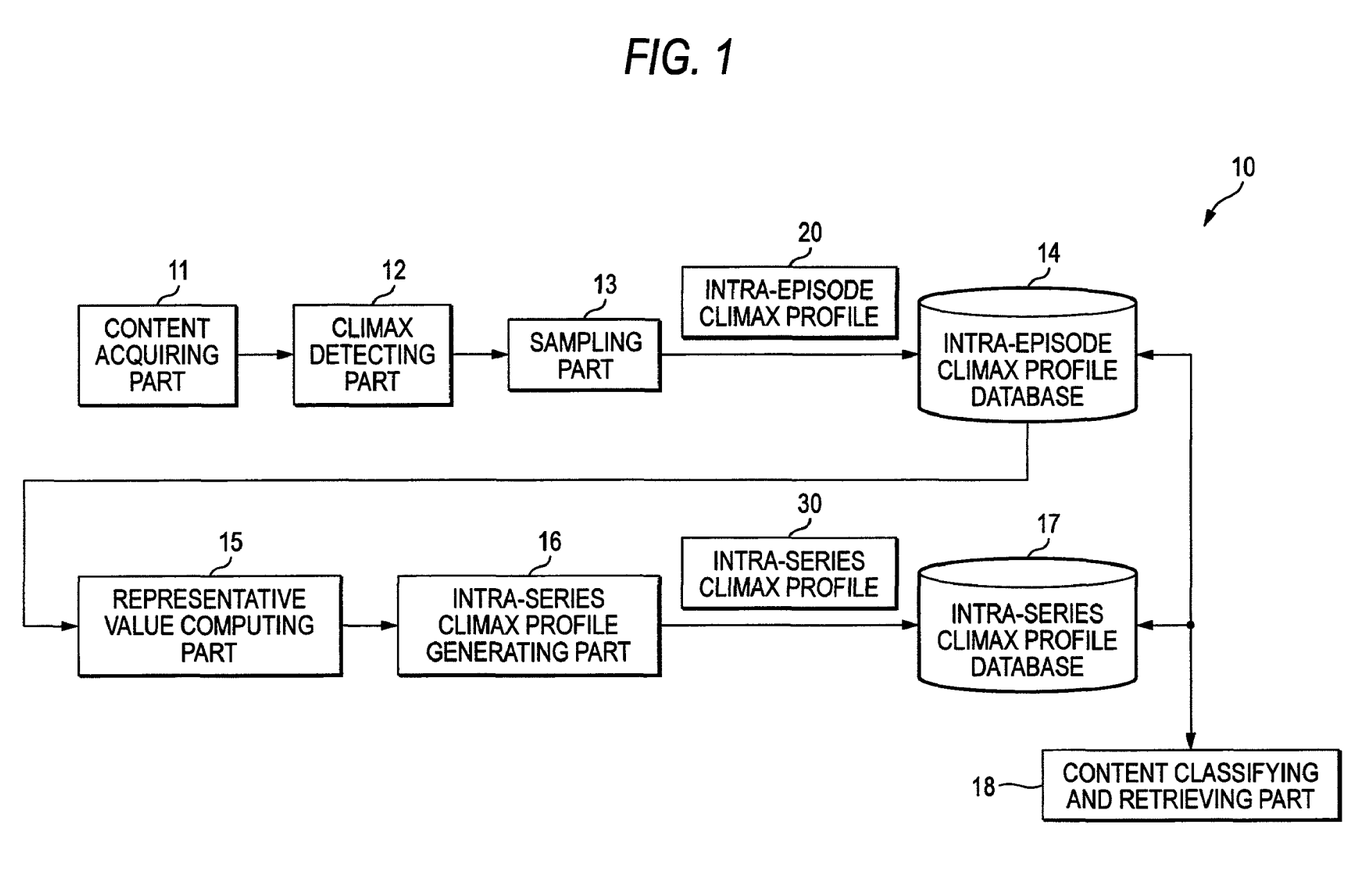
FIG. 1 shows a block diagram depicting an exemplary configuration of a content characteristic amount detecting apparatus to which an embodiment of the invention is adapted.

An information processing apparatus according to the embodiment of the invention is an information processing apparatus (for example, a content characteristic amount detecting apparatus 10 shown in FIG. 1) that detects a characteristic amount of a group of contents of a series configured of contents each corresponding to one of a plurality of episodes, the information processing apparatus including: a first generating means (for example, a climax detecting part 12 and a sampling part 13 shown in FIG. 1) for detecting a characteristic amount in a time series of the contents each corresponding to one of the plurality of the episodes and generating a characteristic amount in the episode based on a detected result; a computing means (for example, a representative value computing part 15 shown in FIG. 1) for computing a representative value of the generated characteristic amount in the episode; a second generating means (for example, an intra-series climax profile generating part 16 shown in FIG. 1) for arranging the computed representative values each corresponding to one of the plurality of the episodes in a time series and generating a characteristic amount in the series indicating a characteristic amount in a time series of the group of the contents of the series; and a database means (for example, an intra-series climax profile database 17 shown in FIG. 1) for storing the generated characteristic amount in the series in a database in association with the group of the contents of the series.

The information processing apparatus according to the embodiment of the invention may further include a classifying means (for example, a content classifying and retrieving part 18 shown in FIG. 1) for classifying the group of the contents of the series based on the generated characteristic amount in the series, wherein the database means also stores a classified result by the classifying means in a database in association with the group of the contents of the series.

The information processing apparatus according to the embodiment of the invention may further include a retrieving means (for example, the content classifying and retrieving part 18 shown in FIG. 1) for retrieving the group of the contents of the series by referencing to a classified result by the classifying means.

Figure 2:
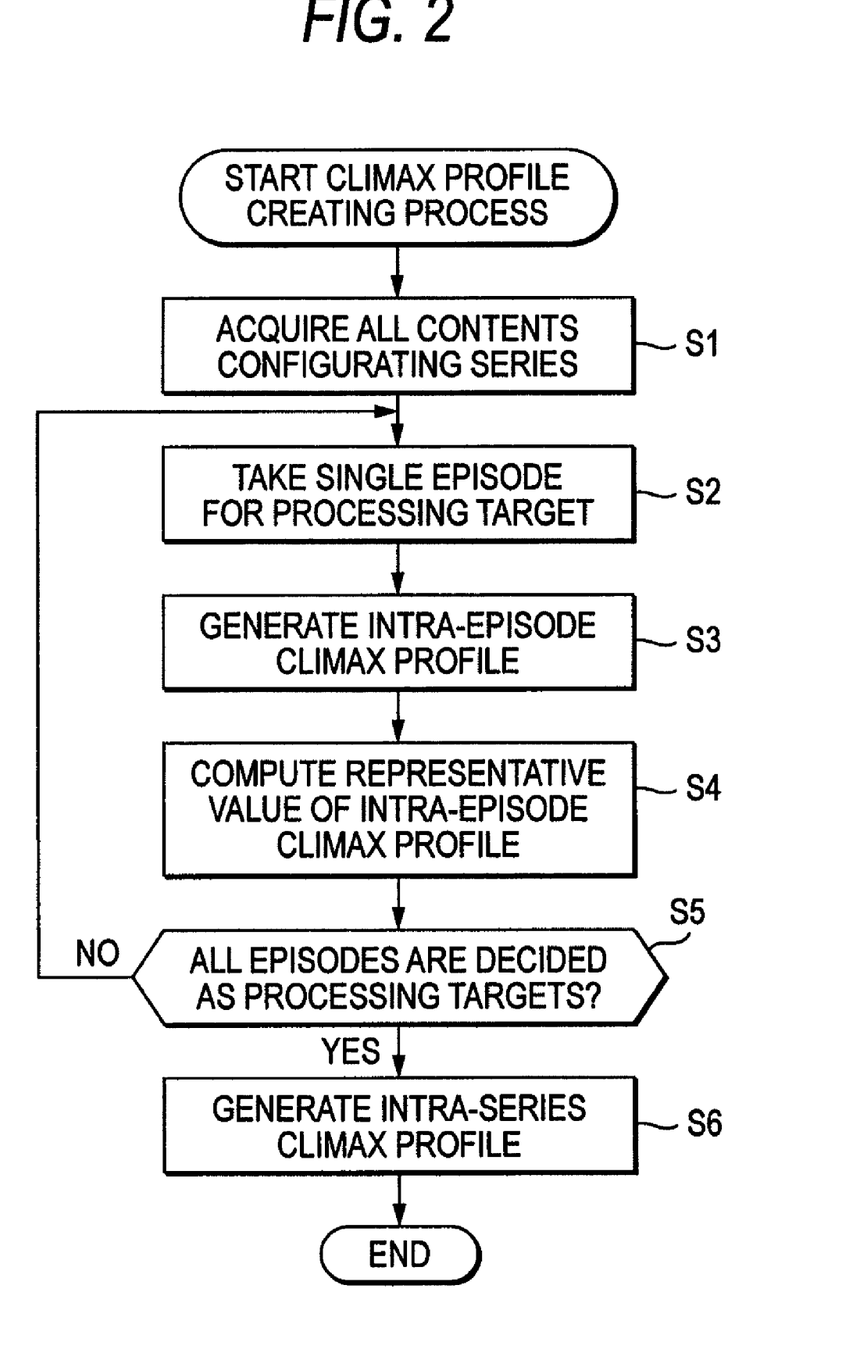
FIG. 2 shows a flowchart illustrative of a climax profile creating process.

An information processing method and a program according to an embodiment of the invention are an information processing method of an information processing apparatus that detects a characteristic amount of a group of contents of a series configured of contents each corresponding to one of a plurality of episodes, and a program of controlling a computer that detects a characteristic amount of a group of contents of a series configured of contents each corresponding to one of a plurality of episodes, the information processing method and the program allowing the computer to run a process including the steps of: detecting a characteristic amount in a time series of the contents each corresponding to one of the plurality of the episodes and generating a characteristic amount in the episode based on a detected result (for example, Step S3 shown in FIG. 2); computing a representative value of the generated characteristic amount in the episode (for example, shown in FIG. 2 Step S4); arranging the computed representative values each corresponding to one of the plurality of the episodes in a time series and generating a characteristic amount in the series indicating a characteristic amount in a time series of a group of contents corresponding to the series (for example, Step S6 shown in FIG. 2); and storing the generated characteristic amount in the series in a database in association with the group of the contents of the series (for example, Step S6 shown in FIG. 2).

Hereinafter, a specific embodiment to which an embodiment of the invention is adapted will be described in detail with reference to the drawings.

FIG. 1 shows an exemplary configuration of a content characteristic amount detecting apparatus that is an embodiment of the invention. This content characteristic amount detecting apparatus 10 detests a climax situation in a time series in units of episodes as a characteristic amount of a content typified by a television program as well as detects a climax situation in a time series in a unit of a series.

In addition, the contents are not restricted to television programs. For example, the contents include video data and music data distributed over a network typified by the Internet and mobile telephone networks or sold by package media such as a DVD (Digital Versatile Disc).

The content characteristic amount detecting apparatus 10 is configured of a content acquiring part 11 that acquires contents (including video data, audio data, subtitle data and other data) each corresponding to one of a plurality of episodes configuring a series, a climax detecting part 12 that detects climax situations of the individual contents, a sampling part 13 that samples a value indicating the detected climax situation and generates an intra-episode climax profile 20 in a predetermined cycle, an intra-episode climax profile database (DB) 14 that associates the generated intra-episode climax profiles 20 with the episodes for storage, a representative value computing part 15 that decides a representative value of the intra-episode climax profiles 20 corresponding to the individual episodes, an intra-series climax profile generating part 16 that generates an intra-series climax profile 30 formed of the representative values of the individual episodes configuring the series, an intra-series climax profile database (DB) 17 that associates the generated intra-series climax profile 30 with the series for storage, and a content classifying and retrieving part 18 that classifies the individual intra-episode climax profiles 20 and the individual intra-series climax profiles 30 and retrieves episodes and series.

Next, a climax profile creating process performed by the content characteristic amount detecting apparatus 10 will be described with reference to a flow chart shown in FIG. 2.

In Step S1, the content acquiring part 11 acquires contents each corresponding to one of a plurality of episodes configuring a series from a database (not shown) in which a large number of contents are stored. In Step S2, the content acquiring part 11 decides a single episode as a processing target among all the acquired contents configuring the series, and outputs a content corresponding to the decided episode to the climax detecting part 12.

In Step S3, the climax detecting part 12 detects a sound level, the number of times of screen changes (such as a scene change), and an amount of subtitles in a time series as parameters for the climax situations in a time series of the contents inputted from the content acquiring part 11, and outputs to the sampling part 13.

In addition, in the case in which the sound level is high, the number of times of screen changes is large, or the amount of subtitles is great in a scene, it can be considered that the scene is a climax section in an episode.

For detecting screen changes, for example, a method described in Japanese Patent No. 3560217 can be adapted. For detecting an amount of subtitle information, a method described in Japanese Patent Application No. 2006-30483 can be adapted, which is filed by the applicant.

Figure 3:
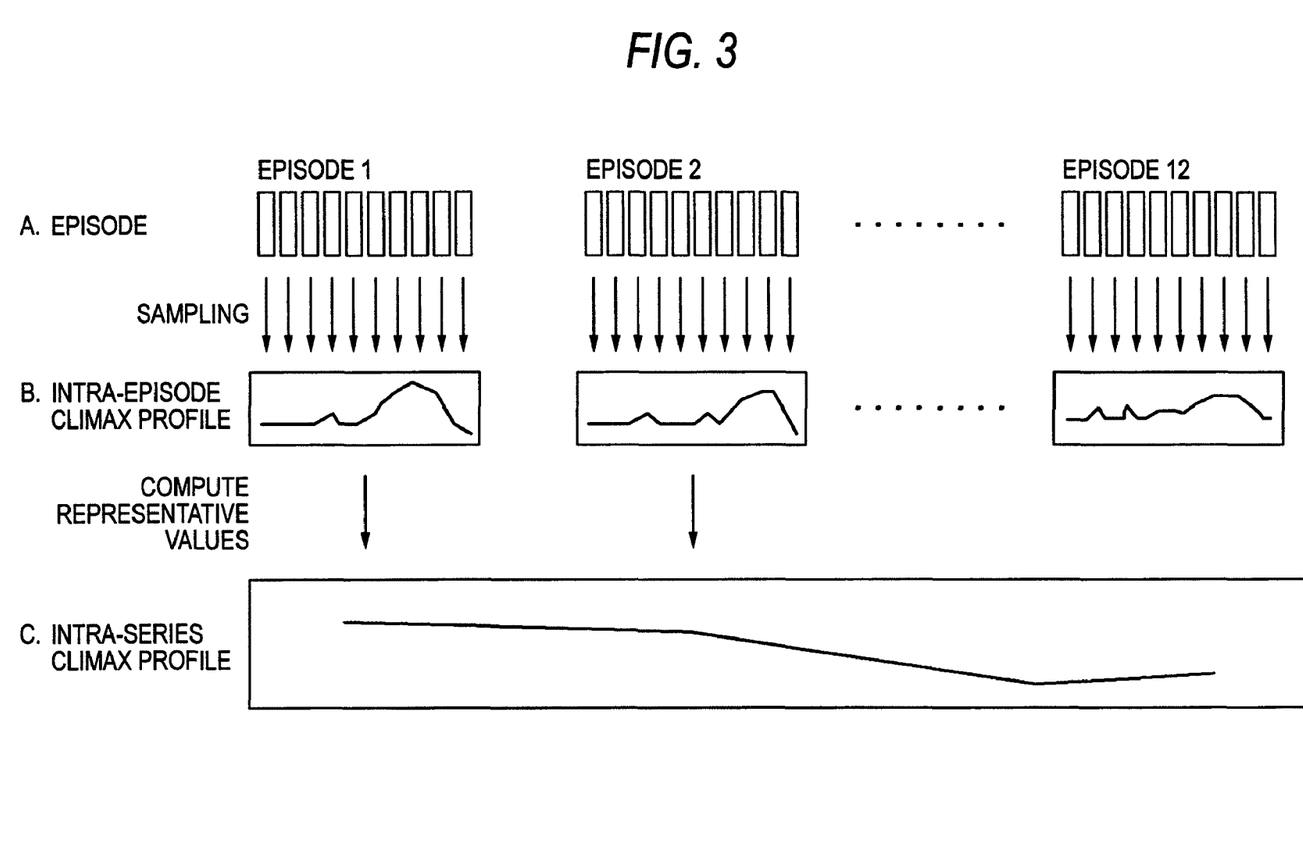
FIG. 3 shows a diagram depicting the outline of the climax profile creating process.

As shown in A in FIG. 3, the sampling part 13 samples the values of the individual items (the sound level, the number of times of screen changes, the amount of subtitle information) indicating the climax situations detected by the climax detecting part 12 at predetermined cycles, and generates vectors having the values of the individual sampled items in different dimensional elements (in this case, three dimensional vectors), and arranges the generated vectors in a time series for generating an intra-episode climax profiles 20. The generated intra-episode climax profile 20 is supplied to the intra-episode climax profile database 14, and stored in association with the episode.

In Step S4, as shown in B in FIG. 3, the representative value computing part 15 acquires the intra-episode climax profiles 20 from the intra-episode climax profile database 14, computes the representative values of the intra-episode climax profiles 20 such as the mean value of the vectors, the maximum value, and the distributed values in a time series, and then outputs them to the intra-series climax profile generating part 16.

In Step S5, the content acquiring part 11 determines whether all the episodes of the series whose contents are acquired in the process step of Step S1 are decided as processing targets. If the content acquiring part 11 determines that all the episodes have not been decided as processing targets (some episodes remain that are not decided as processing targets), the process returns to Step S2. Then, the process steps of Steps S2 to S5 are repeated to compute the intra-episode climax profiles 20 corresponding to all the episodes configuring the series and the representative values thereof.

Then, in Step S5, if the content acquiring part 11 determines that all the episodes of the series whose contents are acquired in the process step of Step S1 are decided as processing targets (no episode remains that is not decided as a processing target), the process goes to Step S6.

In Step S6, as shown in C in FIG. 3, the intra-series climax profile generating part 16 arranges the representative values of the individual episodes configuring the series in a time series to generate an intra-series climax profile 30. The generated intra-series climax profile 30 is supplied to the intra-series climax profile database 17, and stored in association with the series.

As discussed above, the description of the climax profile creating process performed by the content characteristic amount detecting apparatus 10 is ended.

As discussed above, according to the climax profile creating process performed by the content characteristic amount detecting apparatus 10, the climax situation in a time series can be acquired in units of episodes as the characteristic amount of a content as well as acquired in a unit of a series.

In addition, the intra-episode climax profiles 20 stored in the intra-episode climax profile database 14 and the intra-series climax profile 30 stored in the intra-series climax profile database 17 are classified into various types by the content classifying and retrieving part 18.

In other words, the content classifying and retrieving part 18 classifies the individual intra-episode climax profiles 20 stored in the intra-episode climax profile database 14 into a flat type, a first half climax type, or a second half climax type, for example.

For the classifying method, there is a method in which the templates of the intra-episode climax profiles 20 corresponding to the individual types are prepared in advance and the similarity of the generated intra-episode climax profile 20 is actually computed and compared with the individual templates. Alternatively, there is a method in which the generated intra-episode climax profiles 20 are directly analyzed.

In addition, the content classifying and retrieving part 18 makes access to the intra-series climax profile database 17, and classifies the individual intra-series climax profiles 30 stored in the intra-series climax profile database 17 into a flat type, a first half climax type, a second half climax type, a series type, and a type that a story is concluded in one episode, for example.

For the classifying method, as similar to the methods of classifying the intra-episode climax profile 20, there are a method of using templates, and a method of direct analysis.

Figure 4:
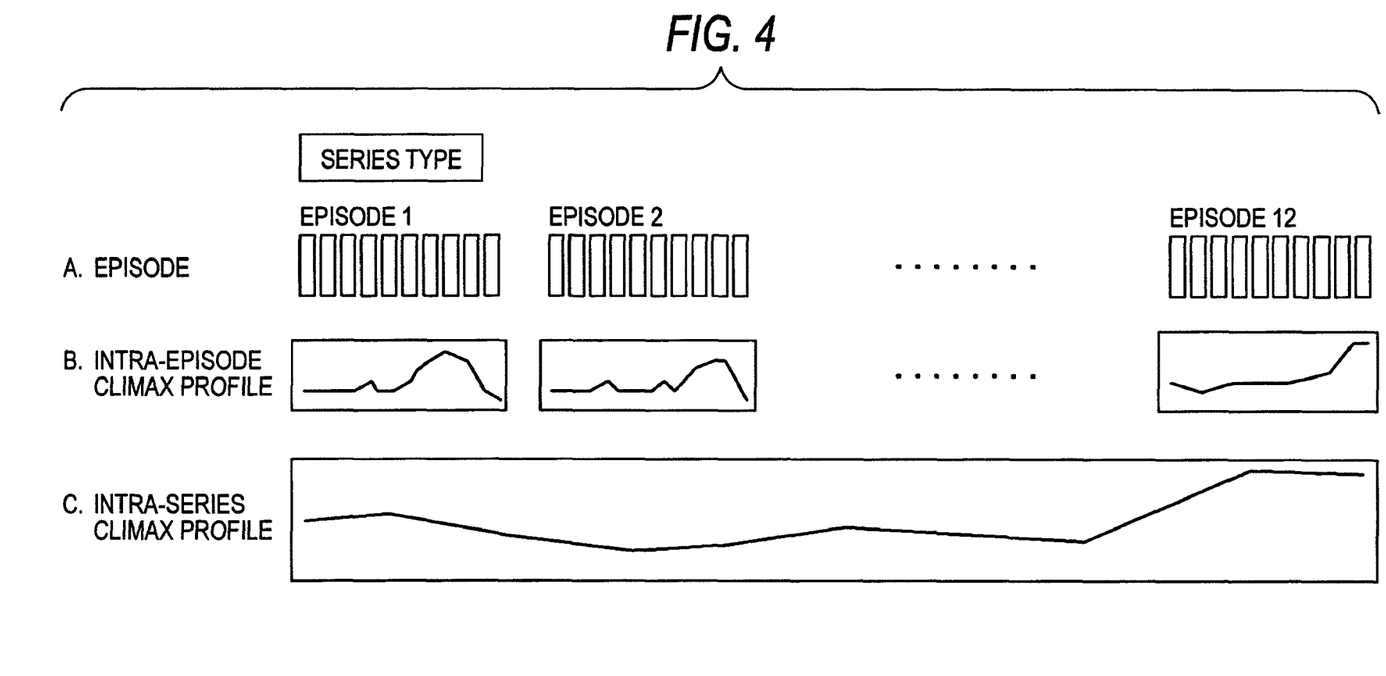
FIG. 4 shows a diagram depicting the profile of the contents classified into a series type.

As shown in FIG. 4, for example, in the case in which intra-episode climax profiles 20 corresponding to individual episodes configuring a series are greatly varied and the climax situations are raised to the last stage of the series, this case can be classified as a series type such as a drama series in which stories are continued between the individual episodes.

Figure 5:
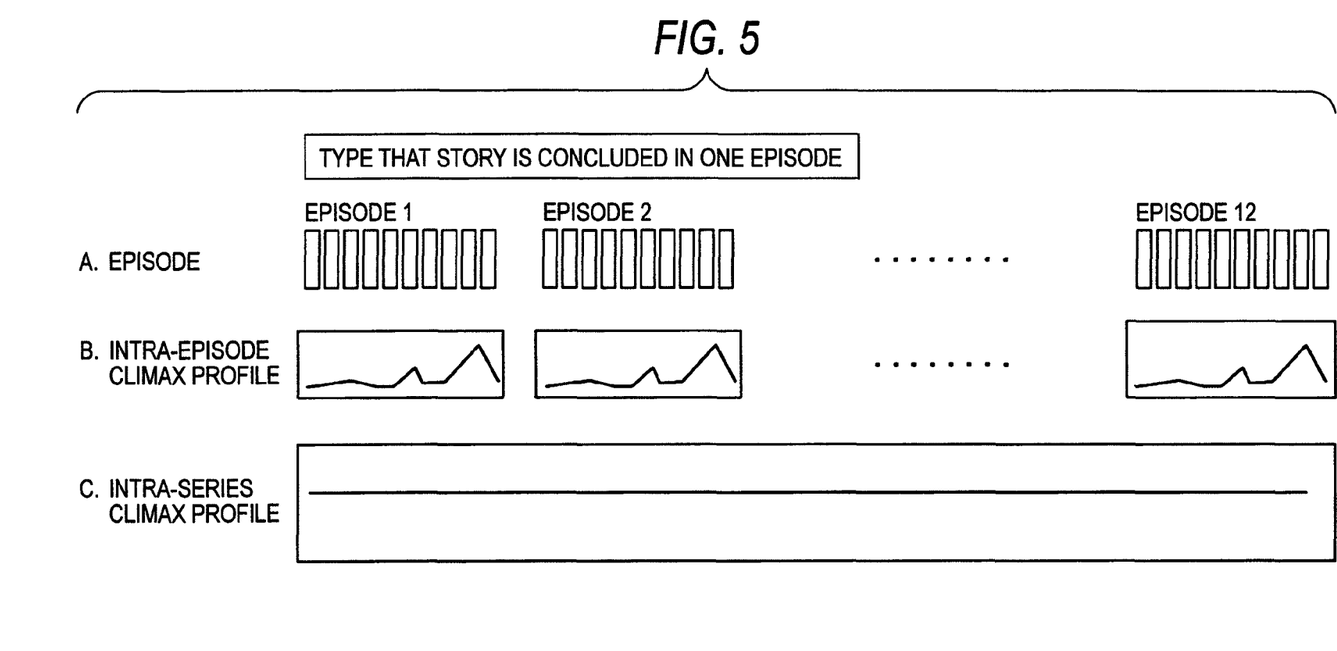
FIG. 5 shows a diagram depicting the profile of the contents classified into a type that a story is concluded in one episode.

In addition, for example, as shown in FIG. 5, in the case in which intra-episode climax profiles 20 corresponding to individual episodes configuring a series resemble each other and the climax situations are flat throughout the series, this case can be classified as a type that a story is concluded in one episode in which stories are concluded in the individual episodes.

Moreover, the classification of the episodes may be combined with the classification of the series for classification. For example, in the case in which types of episodes more than a half of all the episodes configuring a series are matched and the type of series is a flat type, the series is classified as a stable one episode conclusion type. In the case in which types of episodes more than a half of all the episodes configuring a series are matched and the type of series is not a flat type, the series is classified as a stable series type. In the case in which types of episodes more than a half of all the episodes configuring a series are not matched and the type of series is a flat type, the series is classified as a type that a climax is different in every episode. In the case in which types of episodes more than a half of all the episodes configuring a series are not matched and the type of series is not a flat type, the series is classified as a roller coaster series type.

The classified result of the episode or the series is recorded in the intra-episode climax profile database 14, or in the intra-series climax profile database 17, which is used for retrieval in units of episodes of the contents or in a unit of a series. This retrieval is performed by the content classifying and retrieving part 18. In otherwords, the content classifying and retrieving part 18 references to the intra-episode climax profile database 14, or the intra-series climax profile database 17 to retrieve the contents classified into desired types in units of episodes, or in a unit of a series.

As discussed above, according to the climax profile creating process performed by the content characteristic amount detecting apparatus 10, the climax situation in a time series can be detected in units of episodes as the characteristic amount of a content as well as detected in a unit of a series. In addition, the type of a content can be classified in units of episodes as well as in a unit of a series based on the detected climax situations in a time series. Furthermore, the classified result is referenced to retrieve the contents in units of episodes as well as in a unit of a series.

A series of the process steps described above may be implemented by hardware configured as shown in FIG. 1, or may be by software. In the case in which a series of the process steps is executed by software, a program configuring the software is installed in a computer incorporated in a dedicated hardware, or is installed from a program recording medium to a multi-purpose personal computer, for example, that can run various functions by installing various programs.

Figure 6:
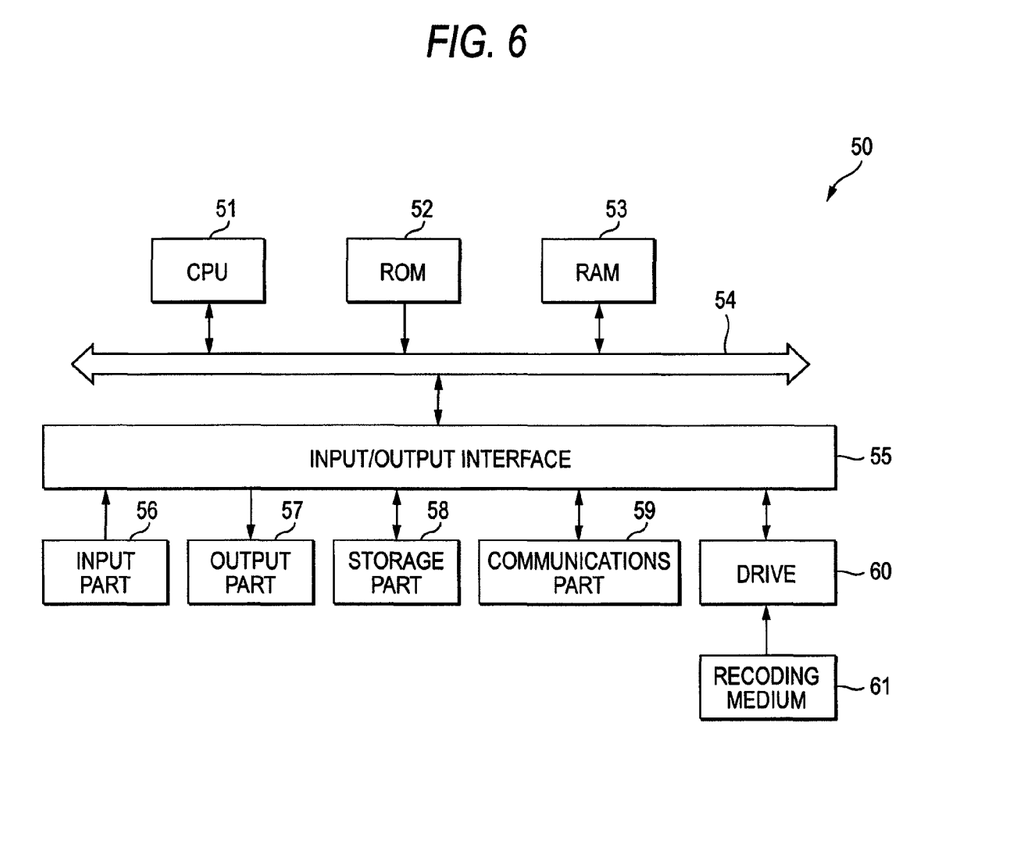
FIG. 6 shows a block diagram depicting an exemplary configuration of a multi-purpose computer.

FIG. 6 shows a block diagram depicting an exemplary hardware configuration of a computer that runs a series of the process steps described above by a program.

In this computer 50, a CPU (Central Processing Unit) 51, a ROM (Read Only Memory) 52, and a RAM (Random Access Memory) 53 are connected to each other through a bus 54.

To the bus 54, an input/output interface 55 is further connected. To the input/output interface 55, the following components are connected: an input part 56 formed of a keyboard and a mouse, an output part 57 formed of a display and a speaker, a storage part 58 formed of a hard disk or a nonvolatile memory, a communicating part 59 formed of a network interface, and a drive 60 that drives a recording medium 61 such as a magnetic disk, an optical disk, a magneto-optical disk, or a semiconductor memory.

In the computer 50 configured described above, for example, the CPU 51 loads a program stored in the storage part 58 to the RAM 53 through the input/output interface 55 and the bus 54, and runs the program, whereby a series of the process steps described above is performed.

In addition, the program run by the computer 50 may be a program in which process steps are executed in a time series along the order described in the specification, or may be a program in which process steps are executed in parallel, or at a necessary timing when called.

In addition, the embodiment of the invention is not limited to the embodiments described above, which can be modified within the scope not deviating from the teaching of an embodiment of the invention.

It should be understood by those skilled in the art that various modifications, combinations, sub-combinations and alterations may occur depending on design requirements and other factors insofar as they are within the scope of the appended claims or the equivalents thereof.

What is claimed is:

1. A method of generating a climax profile representing a dramatic characteristic of a story presented in one or more episodes of audio/video (A/V) content which cumulatively form a series, comprising the steps of:
   acquiring an A/V signal;
   sampling said A/V signal to sample screen changes of the A/V content and, when present, subtitles of the A/V content of respective episodes to obtain sample values;
   calculating, by a processor, from said sample values, a number of screen changes or an amount of subtitles of a respective episode;
   generating vectors having values derived from said calculated number of screen changes or amount of subtitles;
   arranging said vectors in a time series to generate an intra-episode climax profile;
   calculating from said vectors representative values of plural intra-episode climax profiles;
   calculating, by a processor, from plural intra-episode climax profiles of the episodes in a series, the climax profile of said series by arranging said representative values of said plural intra-episode climax profiles in a time series to produce the series climax profile;
   storing said respective intra-episode climax profiles and said series climax profile; and
   using a processor to classify the stored intra-episode climax profiles and the stored series climax profiles as predetermined types of profiles.

2. The method of claim 1, wherein said screen changes are identified as sound or scene changes.

3. The method of claim 2, wherein said sample values include sound level.

4. The method of claim 1, wherein said representative values of said plural intra-episode climax profiles include mean value, maximum value and distributed value of said vectors.

5. The method of claim 1, wherein said predetermined types of profiles include flat type, first half climax type, second half climax type and series type of profiles.

6. The method of claim 1, wherein the step of classifying the stored intra-episode climax profiles comprises comparing respective intra-episode climax profiles to predetermined templates.

7. Apparatus for generating climax profiles representing a dramatic characteristic of a story presented in one or more episodes of audio/video (A/V) content which cumulatively form a series, comprising:
- an input for acquiring an A/V signal;
- a signal sampler configured to sample said A/V signal and obtain samples of screen changes of the A/V content and, when present, subtitles of the A/V content of respective episodes to obtain sample values;
- a processor configured to calculate, from said sample values, a number of screen changes or an amount of subtitles of a respective episode;
- said processor being additionally configured to generate vectors having values derived from said calculated number of screen changes or amount of subtitles;
- said processor being further configured to arrange said vectors in a time series to generate an intra-episode climax profile;
- said processor being further configured to calculate from said vectors representative values of plural intra-episode climax profiles;
- means for calculating, from plural intra-episode climax profiles of the episodes in a series, the climax profile of said series by arranging said representative values of said plural intra-episode climax profiles in a time series to produce the series climax profile;
- a store for storing said respective intra-episode climax profiles and said series climax profile; and
- classifying means for classifying the stored intra-episode climax profiles and the stored series climax profiles as predetermined types of profiles.

8. The apparatus of claim 7, wherein said screen changes are identified as sound or scene changes.

9. The apparatus of claim 8, wherein said sample values include sound level.

10. The apparatus of claim 7, wherein said representative values of said plural intra-episode climax profiles include mean value, maximum value and distributed value of said vectors.

11. The apparatus of claim 7, wherein said classifying means comprises comparing means for comparing respective intra-episode climax profiles to predetermined templates.

12. A non-transitory computer-readable storage medium encoded with a program that, when executed by a computer, operates to perform the steps of:
- sampling screen changes of audio/video (A/V) content and, when present, subtitles of said A/V content of respective episodes that cumulatively form a series to obtain sample values;
- calculating, from said sample values, a number of screen changes or an amount of su1btitles of a respective episode;
- generating vectors having values derived from said calculated number of screen changes or amount of subtitles;
- arranging said vectors in a time series to generate an intra-episode climax profile;
- calculating from said vectors representative values of plural intra-episode climax profiles;
- calculating, from plural intra-episode climax profiles of the episodes in a series, the climax profile of said series by arranging said representative values of said plural intra-episode climax profiles in a time series to produce the series climax profile;
- storing said respective intra-episode climax profiles and said series climax profile; and
- classifying the stored intra-episode climax profiles and the stored series climax profiles as predetermined types of profiles.

* * * * *